United States Patent [19]

Umeda

[11] Patent Number: 5,153,405
[45] Date of Patent: Oct. 6, 1992

[54] COOLING WATER PIPING SYSTEM FOR WELDING ROBOT GUN

[75] Inventor: Shigeru Umeda, Tokyo, Japan

[73] Assignee: Obara Corporation, Tokyo, Japan

[21] Appl. No.: 754,755

[22] Filed: Sep. 4, 1991

[30] Foreign Application Priority Data

Jan. 24, 1991 [JP] Japan ................... 3-6427[U]

[51] Int. Cl.⁵ ............... B23K 11/10; B23K 11/36
[52] U.S. Cl. .................................... 219/86.31
[58] Field of Search ................ 219/86.31, 116

[56] References Cited

U.S. PATENT DOCUMENTS 4,485,289 11/1984 Schwartz ............... 219/116
4,985,612 1/1991 Izume et al. ........... 219/116

FOREIGN PATENT DOCUMENTS 61-86178 8/1986 Japan .
62-6781 1/1987 Japan ................ 219/86.31

*Primary Examiner*—Geoffrey S. Evans
*Attorney, Agent, or Firm*—Flynn, Thiel, Boutell & Tanis

[57] ABSTRACT

A water cooling piping system for welding robot gun comprising first to third cooling water supply pipes and first to fourth cooling discharge pipes for cooling an electrical transformer and other elements and capable of improving the efficiency of the welding operation reducing the bulkiness and weight of the conventional piping system by way of eliminating the manifold and simplifying the piping.

1 Claim, 1 Drawing Sheet

COOLING WATER PIPING SYSTEM FOR WELDING ROBOT GUN

BACKGROUND OF THE INVENTION

1. Field of the Invention

The present invention relates to a water cooling piping system for cooling an electrical transformer and a welding gun in a welding robot gun.

2. Prior Art

A conventional water piping system for cooling an electrical transformer and a welding gun in a welding gun robot will be described with reference to FIG. 2.

Cooling water is supplied to a manifold 23 mounted on a welding robot gun 22 provided at the side thereof by way of a pipe 21. Cooling water thus supplied to the manifold 23 is supplied to a fixing arm 24 by way of a pipe 25, to a pressure rod 26 by way of a pipe 27, and to a secondary terminal 29 of an electrical transformer 28 by way of a pipe 30. Cooling water which has cooled these elements is discharged toward the manifold 23 from the fixing arm 24 by way of a pipe 31, from the pressure rod 26 by way of a pipe 32 and from another secondary terminal 33 of the electrical transformer by way of a pipe 34. Cooling water thus discharged toward the manifold 23 is collected therein, and then discharged toward a discharge side by way of a pipe 35.

The conventional cooling water piping system has such a problem that the piping is complex, protrudes toward the side of the welding robot gun and the manifold and the weight of the manifold is added to that of the welding robot gun, which renders the cooling piping system unsuitable.

SUMMARY OF THE INVENTION

The present invention has been made, in view of the problem of the conventional piping system, and has an object to provide a cooling water piping system for a welding robot gun capable of simplify the piping and reducing the protrusion toward the side of the welding robot gun and reducing the weight of the welding gun, thereby improving the workablility of the welding robot gun.

To achieve the object of the present invention, the cooling water piping system comprises a first cooling water supply pipe disposed between a cooling water supply side and a first secondary terminal of an electrical transformer, a second cooling water supply pipe disposed between the first secondary terminal of the electrical transformer and a fixing arm, a third cooling water supply pipe disposed between the first secondary terminal of the electrical transformer and a pressure rod, a first cooling water discharge pipe disposed between the fixing arm and a second secondary terminal of the electrical transformer, a second cooling water discharge pipe disposed between the pressure rod and the second secondary terminal of the electrical transformer and a third cooling water discharge pipe disposed between the second secondary terminal of the electrical transformer and a cooling water discharge side.

With the arrangement of the cooling water piping system according to the present invention, the following effects can be achieved. Firstly, the manifold can be eliminated. Secondly, the piping system is simplified since the secondary terminal of the electric transformer functions to supply cooling water to the elements and collect cooling water therein for discharge. The piping system does not protrude toward the side of the welding gun. As a result, the weight of the welding gun is reduced as a whole and the workablility of the welding robot gun is remarkably improved.

DESCRIPTION OF THE PREFERRED EMBODIMENT

Figure 1:
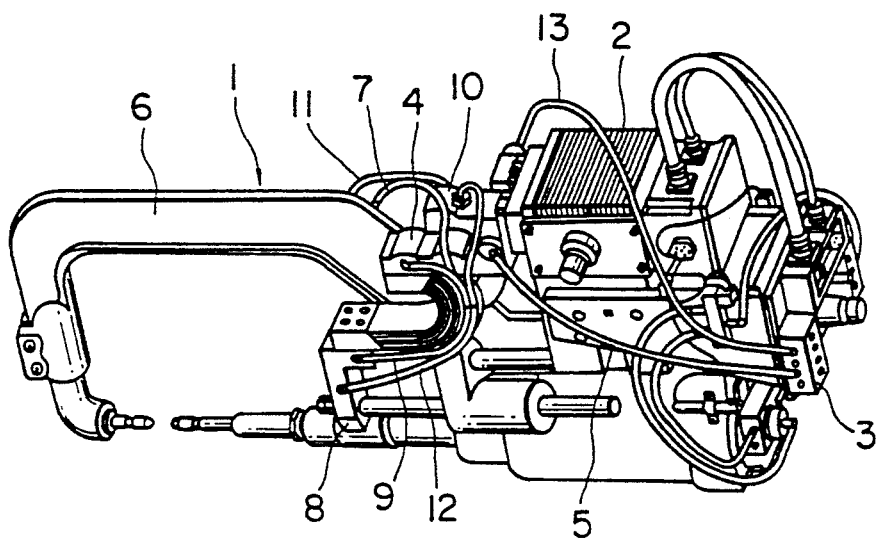
FIG. 1 is a perspective view of a welding robot gun employing a cooling piping system according to a preferred embodiment of the present invention.
Figure 2:
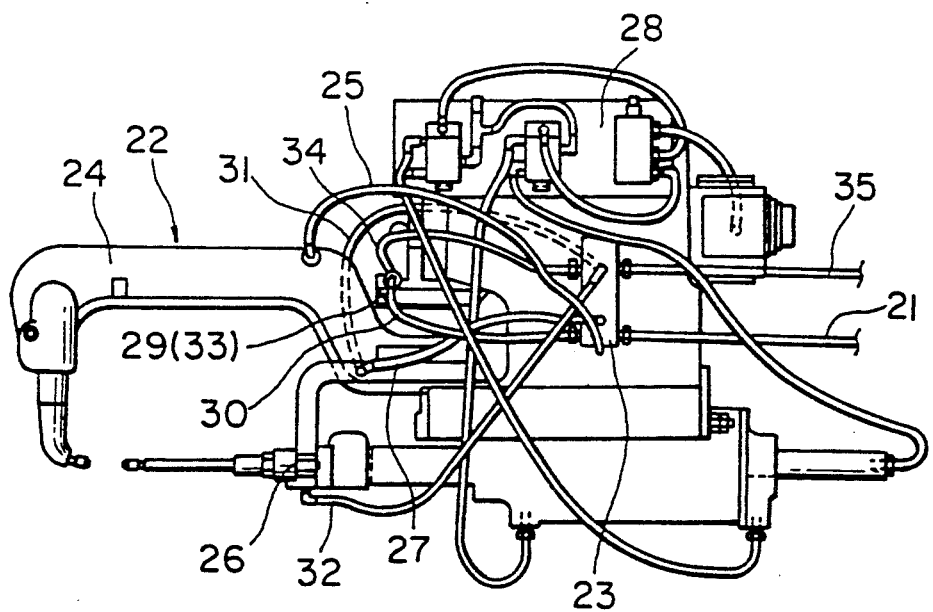
FIG. 2 is a side view of a convential welding robot gun employing a conventional cooling piping system.

A cooling piping system of a welding robot gun according to a preferred embodiment of the present invention will be descrided with reference to FIG. 1.

The cooling piping system comprises a welding robot gun 1 having an electric transformer 2, a fixing arm 6 provided at a front portion thereof, a movable arm provided at a lower portion thereof and a gun changer 3 to be detachably connected to a robot (not shown). The electric transformer 2 has first and second secondary terminals 4 and 10. A first cooling supply pipe 5 is disposed between the gun changer 3 and the first terminal 4 while a second cooling supply pipe 7 is disposed between the first secondary terminal 4 and the fixing arm 6 and a third cooling supply pipe 9 is disposed between the first secondaly terminal 4 and the pressure rod 8. A known cooling supply passage (not shown) extends to the secondary terminal 10 through the electrical transformer 2.

A first cooling discharge pipe 11 is disposed between the fixing arm 6 and the second secondary terminal 10 and a second cooling discharge pipe 12 is disposed between the pressure rod 8 and the second secondary terminal 10 while a third cooling discharge pipe 13 is disposed between the second secondary terminal 10 and the gun changer 3.

An arrangement of the cooling piping system of the welding robot gun will operate as follows.

A cooling water supplied from the robot side to the gun changer 3 is directly supplied to the first secondary terminal 4 by the first cooling supply pipe 5. The cooling water is supplied from the first secondary terminal 4 to the fixing arm 6 by the second cooling supply pipe 7 while supplied from the first secondary terminal 4 to the pressure rod 8. The cooling water passed inside the electrical transformer 2 from the first secondary terminal 4 is introduced into the second secondary terminal 10.

The cooling water is, after cooling the fixing arm 6, discharged from the first cooling dischage pipe 11 and the cooling water is, after cooling the pressure rod 8, discharged from the second cooling discharged pipe 12.

Cooling water thus discharged from the first and second cooling discharge pipes 11 and 12 is collected by the second secondary terminal 10 of the electrical transformer 2 and thereafter discharged directly toward the gun changer 3 by the cooling discharge pipe 13.

As is evident from the above explanation, cooling water from the water supply side is directly supplied to the first secondary terminal of the electrical transformer and introduced into the fixing arm, the pressure rod and the electrical transformer where cooling water cools them, then collected in the second secondary terminal of the electric transformer and discharged thereafter.

Although the cooling piping system according to the present embodiment supplies and discharges the cooling water by way of the gun changer, it can be directly connected to a water supply side or a water discharge portion irrespective of the presence of the gun changer.

What is claimed is:

1. A cooling water piping system for welding robot gun comprising;

- a first cooling water supply pipe disposed between a cooling water supply side and a first secondary terminal of an electrical transformer;
- a second cooling water supply pipe disposed between the first secondary terminal of the electrical transformer and a fixing arm;
- a third cooling water supply pipe disposed between the first secondary terminal of the electrical transformer and a pressure rod;
- a fourth cooling water supply passage disposed through the electric transformer between the first and second secondary terminals thereof;
- a first cooling water discharge pipe disposed between the fixing arm and the second secondary terminal of the electric transformer;
- a second cooling water discharge pipe disposed between the pressure rod and the second secondary terminal of the electric transformer; and
- a third cooling water discharge pipe disposed between the second secondary terminal of the electrical transformer and a cooling water discharge side.

* * * * *